(12) United States Patent
Walker

(10) Patent No.: US 7,869,908 B2
(45) Date of Patent: Jan. 11, 2011

(54) METHOD AND SYSTEM FOR DATA COLLECTION AND ANALYSIS

(75) Inventor: John David Walker, Erie, PA (US)

(73) Assignee: General Electric Company, Schenectady, NY (US)

( * ) Notice: Subject to any disclaimer, the term of this patent is extended or adjusted under 35 U.S.C. 154(b) by 756 days.

(21) Appl. No.: 11/337,184

(22) Filed: Jan. 20, 2006

(65) Prior Publication Data

US 2007/0173989 A1    Jul. 26, 2007

(51) Int. Cl.
*G06F 17/00* (2006.01)
*G01C 22/00* (2006.01)
*G06G 7/70* (2006.01)
*G06F 11/00* (2006.01)

(52) U.S. Cl. .............. 701/19; 701/24; 701/26; 701/29; 701/117; 702/58; 700/79; 714/25; 714/26; 714/37; 714/481

(58) Field of Classification Search .......... 701/117, 701/29, 24, 26, 19; 714/48, 26, 37, 25; 702/58; 700/79

See application file for complete search history.

(56) References Cited

U.S. PATENT DOCUMENTS

| | | | |
|---|---|---|---|
| 4,774,669 A * | 9/1988 | Schmitz et al. ............ 701/117 |
| 6,199,154 B1 * | 3/2001 | Witt ........................ 712/205 |
| 6,291,987 B1 * | 9/2001 | Dean et al. ............... 324/158.1 |
| 6,324,659 B1 * | 11/2001 | Pierro ...................... 714/48 |
| 6,336,065 B1 * | 1/2002 | Gibson et al. .............. 701/29 |
| 6,338,152 B1 * | 1/2002 | Fera et al. ................. 714/48 |
| 6,343,236 B1 | 1/2002 | Gibson et al. |
| 6,415,935 B1 | 7/2002 | Hins |
| 6,421,618 B1 * | 7/2002 | Kliman et al. ............. 702/58 |
| 6,487,478 B1 * | 11/2002 | Azzaro et al. ............. 701/24 |
| 6,543,007 B1 * | 4/2003 | Bliley et al. .............. 714/26 |
| 6,615,367 B1 * | 9/2003 | Unkle et al. .............. 714/26 |
| 6,622,264 B1 * | 9/2003 | Bliley et al. .............. 714/26 |
| 6,625,589 B1 * | 9/2003 | Varma et al. .............. 706/45 |
| 6,634,000 B1 * | 10/2003 | Jammu et al. ............. 714/37 |
| 6,636,771 B1 | 10/2003 | Varma et al. |
| 6,636,997 B1 * | 10/2003 | Wong et al. ............... 714/728 |
| 6,643,801 B1 * | 11/2003 | Jammu et al. ............. 714/37 |
| 6,650,949 B1 * | 11/2003 | Fera et al. ................ 700/79 |
| 6,651,034 B1 * | 11/2003 | Hedlund et al. .......... 702/183 |
| 6,691,064 B2 | 2/2004 | Vroman |

(Continued)

*Primary Examiner*—Khoi Tran
*Assistant Examiner*—Ian Jen
(74) *Attorney, Agent, or Firm*—Robert Wawrzyn, Esq.; Enrique J. Mora, Esq.; Beusse, Wolter, Sanks, Mora & Maire, P.A.

(57) ABSTRACT

A computer-implemented system and method of contemporaneously testing a respective system on-board each of a plurality of locomotives with a common user interface where the locomotives are in electrical communication with one another for transmitting electronic signals among the locomotives. An electronic signal may be transmitted to the plurality of locomotives instructing a respective on-board computer of each locomotive to synchronously engage a self-load sequence. An electronic signal may be transmitted to the plurality of locomotives instructing a respective engine of each locomotive to execute a testing sequence. Operating parameter data associated with the respective systems may be downloaded from each of the plurality of locomotives through the common user interface to a database engine to determine whether the downloaded operating parameter data is within acceptable operating limits.

25 Claims, 6 Drawing Sheets

U.S. PATENT DOCUMENTS

| | | |
|---|---|---|
| 6,691,957 B2 | 2/2004 | Hess, Jr. et al. |
| 6,725,398 B1 * | 4/2004 | Varma et al. .................. 714/25 |
| 6,795,935 B1 * | 9/2004 | Unkle et al. .................. 714/37 |
| 6,799,154 B1 | 9/2004 | Aragones et al. |
| 6,810,312 B2 | 10/2004 | Jammu et al. |
| 6,810,406 B2 | 10/2004 | Schlabach et al. |
| 6,832,205 B1 | 12/2004 | Aragones et al. |
| 6,947,797 B2 * | 9/2005 | Dean et al. .................... 700/79 |
| 2003/0213875 A1 * | 11/2003 | Hess et al. .............. 246/167 R |
| 2005/0240322 A1 * | 10/2005 | Peltz et al. .................... 701/19 |
| 2006/0085103 A1 * | 4/2006 | Smith et al. .................. 701/19 |

\* cited by examiner

METHOD AND SYSTEM FOR DATA COLLECTION AND ANALYSIS

BACKGROUND OF THE INVENTION

This invention relates generally to a method and system for collecting and analyzing data from relatively complex equipment, and, more particularly, to a computer-based method and system for acquiring data simultaneously from one or more locomotives for testing, diagnostic and predictive maintenance.

The testing, diagnosis, repair, maintenance and/or other servicing of generally complex equipment, such as mobile assets that may include on-road or off-road vehicles, ships, airplanes, railroad locomotives, trucks, and other forms of complex equipment including industrial equipment, consumer appliance equipment, medical imaging equipment, equipment used in industrial processes, telecommunications, aerospace applications, power generation, etc., often involves complex and time consuming processes.

With respect to transportation equipment such as locomotives, the efficient and cost-effective operation of a locomotive or fleet of locomotives demands minimizing the number of failures and vehicle downtime. The expeditious and accurate performance of testing, diagnostic, repair, maintenance and/or other services to locomotives are important for competitive operation. Locomotives typically undergo running maintenance services several times per year, at which time the locomotives are removed from service.

Performing such scheduled maintenance services and ensuring that the locomotives are within acceptable limits of readiness prior to being put back into service is typically performed by trained technicians. Locomotives may also experience failures while in service and undergo daily inspections. The scope and quantity of these services adds a significant cost to an operators' expenses, especially to those having hundreds or more locomotives in service.

Locomotives incorporate various types of on-board sensors that continuously monitor on-board operational parameters of systems, subsystems and/or other components of the locomotive while in operation. Data indicative of such parameters may be stored in on-board database, which may be housed within various locomotive computers. A technician may perform running maintenance services by retrieving portions of this data and entering it into a independent computer for analysis. This process is labor intensive and error prone, which increases operators' costs and may lead to incorrect testing and diagnosis. This approach for data collection and analysis is slow, limits the type and quantity of data retrieved and analyzed, and limits the extent to which the data may be analyzed for testing, diagnostic and predictive maintenance.

Current testing of locomotives during maintenance is performed one locomotive at a time with a manual interface. In this respect, a trained technician will "load-up" or self load the locomotive and manually record into a separate database information displayed on an information display. The technician will enter a desired operating parameter to retrieve data associated with that parameter from an on-board computer. The parameter data is then manually recorded into a laptop computer and subsequently transmitted to another database for further analysis. This process is labor intensive and time consuming, and it may typically take two trained technicians about four hours to perform certain maintenance services on one locomotive.

Thus, there is a need for an improved method and system for collecting data from one or more locomotives that increases the quantity and type of data of data collected and which improves the accuracy and reliability of testing, diagnostic and predictive maintenance. Embodiments of the invention disclosed herein provide a significant reduction in operators' labor costs and improves the overall operating efficiency of a locomotive or fleet of locomotives.

BRIEF DESCRIPTION OF THE INVENTION

A computer-implemented system and method of contemporaneously testing a respective system on-board each of a plurality of locomotives where the locomotives are in electrical communication with one another for transmitting electronic signals among the locomotives. Embodiments of the method may include transmitting an electronic signal to the plurality of locomotives instructing a respective on-board computer of each locomotive to synchronously engage a self-load sequence. An electronic signal may be transmitted to the plurality of locomotives instructing a respective engine of each locomotive to execute a testing sequence. Operating parameter data associated with the respective systems may be downloaded from each of the plurality of locomotives to a database engine and it may be determined whether the downloaded operating parameter data is within acceptable operating limits.

DETAILED DESCRIPTION OF THE INVENTION

Figure 1:
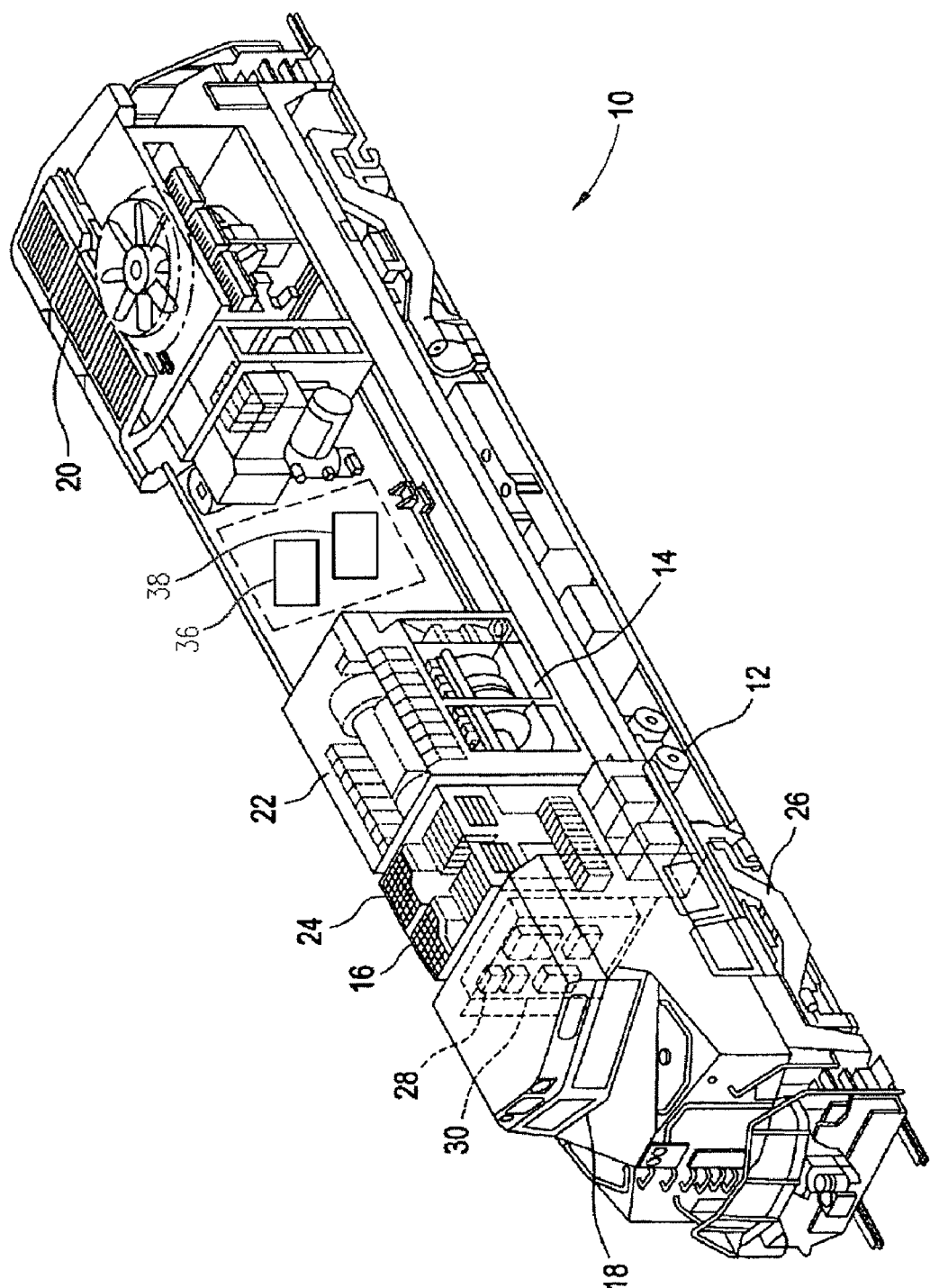
FIG. 1 is a schematic of an exemplary locomotive.

FIG. 1 illustrates a schematic of a locomotive 10 having exemplary on-board systems and subsystems. Locomotive 10 may include a plurality of such systems and subsystems such as, for example, an air and air brake subsystem 12, an auxiliary alternator subsystem 14, a battery and cranker subsystem 16, a cab signal subsystem 18, an engine cooling subsystem 20, an equipment ventilation subsystem 22, a propulsion subsystem 24, a traction alternator subsystem 26, a locomotive control system 28 and an on-board diagnostics subsystem 30. It will be appreciated that locomotive 10 may comprise a wide range of systems and subsystems and that the present invention is not limited to specific systems or subsystems disclosed herein.

One or more systems and/or subsystems on-board locomotive 10 may be associated with one or more on-board computers, also referred to herein as "panels", such as panels 36, 38. Panels 36, 38 may be microprocessor controlled and have respective databases associated therewith. The microprocessors of panels 36, 38 may be configured to control and/or monitor the on-board systems and subsystems during operation or servicing of locomotive 10. Data indicative of respective operating parameters received from the on-board systems and subsystems may be stored in the respective databases for later retrieval and analysis.

Figure 2:
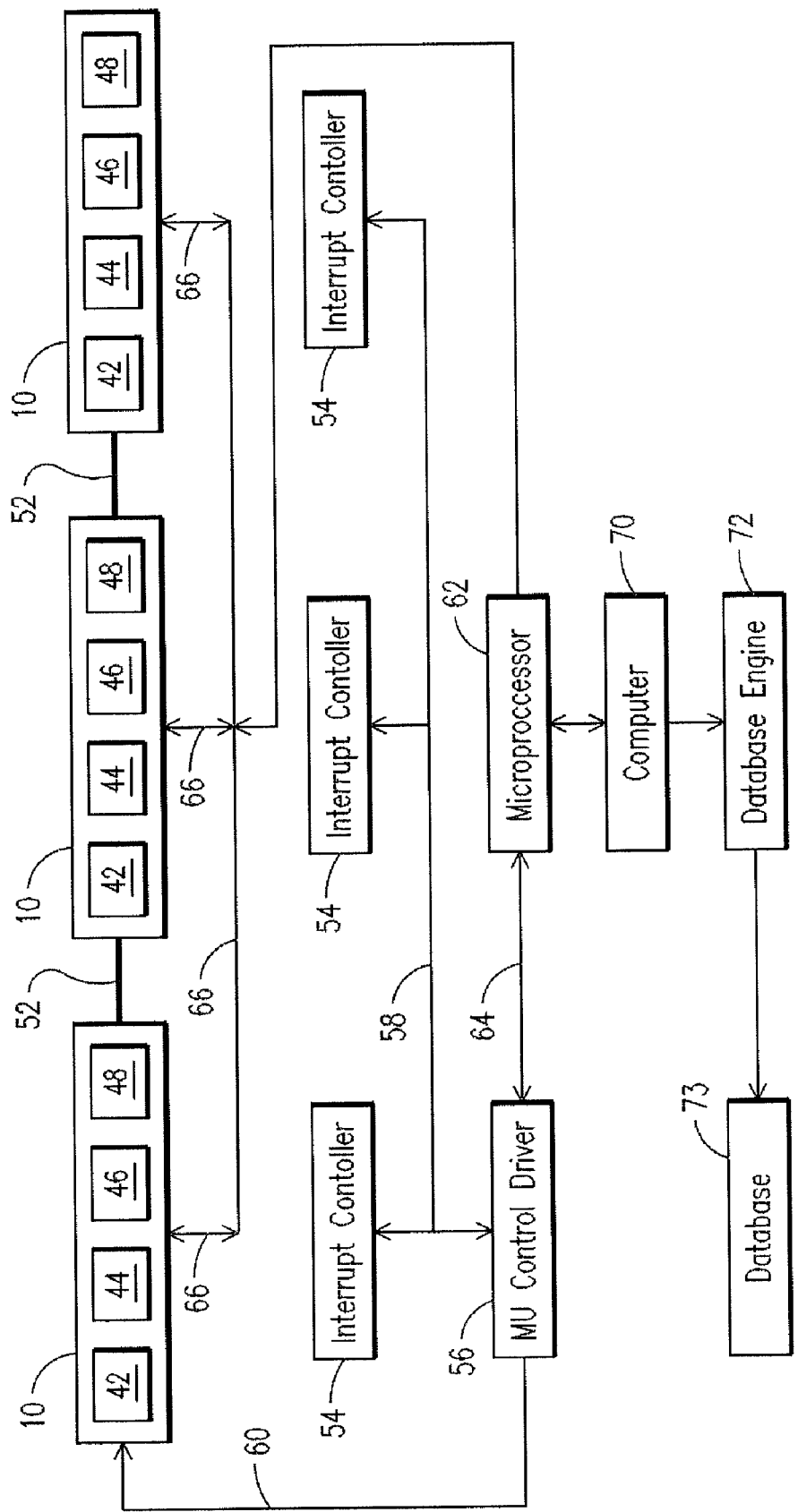
FIG. 2 is a schematic of an exemplary embodiment of a data collection and analysis system.

FIG. 2 illustrates a consist of locomotives 10, exemplary ones of which being referred to as GE Dash 8, GE Dash 9 and AC4400 manufactured and sold by the assignee of the present invention. Locomotives 10 may include one or more on-board computer systems 36, 38, such as a CAB panel 42, an EXC panel 44, an AUX panel 46 and an EGU panel 48. Each of these panels, as well as others that may be on-board a respective locomotive 10, may have respective microprocessors and databases associated therewith that monitor, acquire and store data indicative of various operating parameters of the respective locomotives 10, such as those from on-board systems and subsystems. On-board computer systems 36, 38 may monitor, acquire and store fault log data that may be used for diagnosing malfunctions as disclosed in U.S. Pat. No. 6,947,797, which is incorporated herein by reference in its entirety.

Operating parameters of a locomotive 10 provide information with respect to the operating characteristics of systems and subsystems on-board the locomotive. Operating parameters of a locomotive 10 may be segregated into categories, such as by functionality and associated with one or more of the panels 42, 44, 46, 48. For example, CAB panel 42 may monitor, acquire and store data indicative of various temperature readings, notch readings, horsepower, faults and duty cycles. EXC panel 44 may monitor, acquire and store data indicative of battery information, auxiliary system duty cycles, load potential and generator information. AUX panel 46 may monitor, acquire and store data indicative of various temperature and sensor readings, and EGU panel 48 may monitor, acquire and store data indicative of engine operation parameters, fuel values and fuel limits. It will be appreciated that these exemplary operating parameters are provided for illustration only and that each panel 42, 44, 46, 48 as well as other data collection panels on-board a respective locomotive 10 may monitor, acquire and store data indicative of hundreds or more of other operating parameters associated with respective locomotives 10.

One or more locomotives 10 may undergo road failure services, daily inspections or running maintenance services, all of which may be performed by a trained technician or other service personnel. Running maintenance services may be performed on a predetermine schedule such as three or four times a year. Running maintenance services typically involve a comprehensive evaluation and testing of the systems and subsystems of locomotives 10, as well as a visual inspection.

FIG. 2 illustrates a consist of locomotives 10 connected with multiple-unit (MU) cable segments 52, which provide a hard wire communication link among the locomotives 10. Each MU segment 52 may establish power and electrical communication links between two adjacent locomotives 10. This allows for power and/or electronic data indicative of the respective operating parameters of each locomotive 10 to be transmitted among locomotives 10 and/or to one or more external devices.

FIG. 2 illustrates a plurality of interrupt controllers 54 that may be associated with respective ones of locomotives 10 and connected with a multiple-unit (MU) control driver 56 through cable 58. Interrupt controllers 54 may be switches configured to transmit a control signal to MU control driver 56 when manually activated by a technician. Interrupt controllers 54 allow for a respective locomotive 10 to be immediately shut down such as in the event of on-board system or subsystem failure. Interrupt controllers 54 may be activated at any time during testing procedures, in which case the systems and subsystems of an associated locomotive 10 may be removed from a locomotive testing sequence.

MU control driver 56 may be connected to a first one of the plurality of locomotives 10 via MU cable 60 and to a microprocessor 62 via a serial connection 64. MU control driver 56 and microprocessor 62 may be viewed collectively as a common user interface that enables a user to contemporaneously test the plurality of locomotives from a single location without the user having to separately access each of said locomotives.

MU control driver 56 may be configured to transmit electronic signals indicative of instructions for implementing a locomotive testing sequence associated with the on-board systems and subsystems of the plurality of locomotives 10. The electronic signals may be transmitted through cable 60 to a first locomotive 10 and through cables 52 to the remaining locomotives 10 in a consist. For example, MU control driver 56 may transmit electronic signals indicative of various commands and controls instructive to the plurality of locomotives 10 for executing a testing sequence such as to run their respective engines through a sequence of Notch speeds as more fully described below.

Microprocessor 62 may interface with one or more of the plurality of locomotives 10 through respective cable connections 66, which may be conventional data transmission cable connections including, for example, an Ethernet connection. Connections 66 may interface with a respective locomotive 10 via a data bus for extracting operating parameter data from respective panels 42, 44, 46, 48 of a respective one of the plurality of locomotives 10. In alternate embodiments, operating parameter data may be wirelessly transmitted from respective locomotives 10 to microprocessor 62 via any suitable wireless connection such as an ARCnet connection or any suitable RF devices such as Bluetooth enabled interface devices.

Microprocessor 62 may interface with a computer 70, which may be a commercially available laptop loaded with a database management system having a database engine 72. Microprocessor 62 may be a commercially available device, such as an HC-12 sold by Motorola, and configured to acquire operating parameter data from each of the plurality of locomotives 10 during a testing sequence. Database engine 72 may be configured to receive streaming or discretely sampled operating parameter data from the plurality of locomotives 10 via microprocessor 62. Operating parameter data for all or some of the operating parameters associated with panels 42, 44, 46, 48 may be continuously streamed to engine 72 or transmitted as data sets sampled in timed increments.

Database engine 72 may be configured with an Oracle® database table receiving the streaming or sampled data, which may be indicative of a plurality of operating parameters from each of the plurality of locomotives 10. As appreciated by those skilled in the art, the operating parameter data may indicate the operating characteristics of various systems and subsystems on-board each of the plurality of locomotives 10.

A processing module of computer 70 or database engine 72 may be programmed with executable code to run a query against the operating parameter data streamed into the database table. The operating parameter data may be stored as discrete data subsets where each data subset represents information with respect to a specific operating parameter of interest for one or more of the locomotives 10. The query may be programmed to set an upper and a lower specification limit for each operating parameter data subset being tested.

The upper and lower limits for an operating parameter data subset may be determined based on historical operating parameter data values acquired from the specific locomotive 10 undergoing testing or from a plurality of similar locomotives 10 based on averaged historical operating parameter data values. For example, historical operating parameter data values indicative of an on-board system temperature for a specific locomotive 10 may be between an upper and lower operating range where no failure has occurred. Such historical data may be used to set the upper and lower limits for that operating parameter during testing of the associated locomotive 10.

Similarly, averaged historical operating parameter data values indicative of an on-board system temperature for a plurality of locomotives 10 may be between an upper and lower operating range where no failure has occurred. Such averaged historical data may be used to set the upper and lower limits for that operating parameter during testing of a locomotive 10.

The processing module of computer 70 or database engine 72 may be programmed to take a predetermined sample size of real or "run-time" data from an operating parameter data subset to determine a standard operating performance level for the operating parameter undergoing testing. This standard operating performance level may be determined for an associated operating parameter at various stages of a testing sequence, such as when the engine of a locomotive 10 is running at various Notch speeds. This standard operating performance level may be compared to the historical data associated with the operating parameter to determine whether the standard operating performance level is within acceptable upper and lower limits.

In the event an operating parameter value falls outside an associated upper and/or lower limit then the associated locomotive 10 may be flagged as an RX/Defect. The processing module of computer 70 or database engine 72 may be programmed to detect that an operating parameter value of a locomotive 10 is outside acceptable limits. Notification of such an event may be transmitted to a technician by various means and the associated locomotive 10 may undergo a systematic troubleshooting procedure. Computer 70 may be programmed to retrieve repair data associated with a defective system or subsystem of the flagged locomotive 10 and transmit that data to a display screen, such as one on a handheld PDA. This repair data may be used by a technician to facilitate the troubleshooting procedure.

Microprocessor 62 may be programmed to transmit electronic signals indicative of command or control instructions to MU control driver 56. These signals may be transmitted as a function of the analysis performed on run-time operating parameter data received from one or more of locomotives 10 during a testing sequence. This allows for adjustments to be made to a testing sequence in response to the run-time operating parameter data received from locomotives 10. For example, if analysis of run-time operating parameter data from a locomotive 10 indicates that an operating parameter is outside an acceptable upper or lower limit then microprocessor 62 may instruct MU control driver 56 to transmit a electronic signal to the affected locomotive 10. This electronic signal may instruct a system or subsystem of the affected locomotive 10 to institute corrective action such as shutting down.

Figure 3:
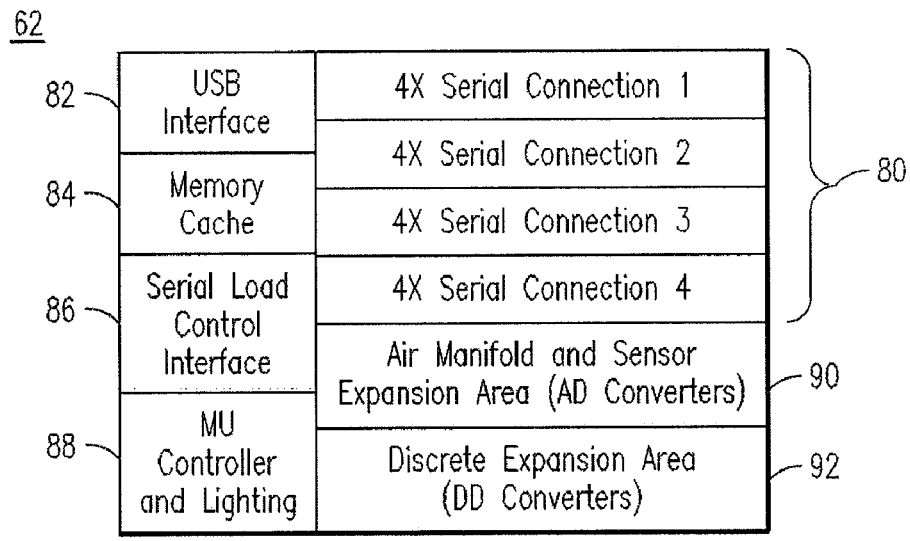
FIG. 3 is a schematic of an exemplary microprocessor.

FIG. 3 illustrates a schematic of an exemplary microprocessor 62 that may include a plurality of serial connections 80, each of which may interface with a respective one of the plurality of locomotives 10 via their respective input/output ports and connections 66. Microprocessor 62 may include a USB interface 82, a memory cache 84, a serial load control interface 86 and an MU control and lighting module 88. Module 88 may be configured with a processing module programmed for transmitting control instructions to MU control driver 56 and illumination lights to indicate to an operator the status of certain on-board systems and subsystems.

A first expansion area 90 may include an analog-to-digital (A/D) converter for receiving and storing discrete electronic signals from a source on a locomotive 10, such as, for example, an on-board sensor monitoring an air manifold. This allows for microprocessor 62 to determine a state or condition of the on-board system or subsystem such as whether its operational capacity is switched or turned on/off. Expansion area 90 may be optically isolated to prevent high voltage spikes from damaging the testing equipment. Data received via expansion area 90 may be logged in a database and used for troubleshooting or analysis of on-board systems and subsystems.

A second expansion area 92 may include a direct current-to-direct current (DC-to-DC) converter for receiving and storing analog signals from a source on a locomotive 10, such as an on-board system or subsystem undergoing evaluation. This allows for microprocessor 62 to determine a state or condition of the on-board system or subsystem, such as whether its operational capacity is switched or turned on/off. Expansion area 92 may be configured with an adjustable gain for each input signal, a clamping circuit to protect it from high voltage spikes and a high impedance to prevent damage from electrical current.

Embodiments of microprocessor 62 may include other expansion devices such as pressure and temperature sensors, for example, that may test for air leaks in the air brake subsystems 12 or engine components undergoing heat fluctuations. Data received via expansion area 92 and others may be logged and used for troubleshooting or analysis of on-board systems and subsystems.

Microprocessor 62 may be configured for a hard-wired or wireless connection with the panels of each locomotive 10 and programmed to extract operating parameter data from the respective panels, such as panels 42, 44, 46, 48. This data may be transmitted by hard wire or wirelessly from microprocessor 62 to computer 70, which may be programmed with executable code for conducting various types of data analysis. Microprocessor 62 may be configured for a hard-wired or wireless connection with MU control driver 56 and programmed to transmit command or control signals to MU control driver 56. Such signals may be transmitted in response to an executable program stored on microprocessor 62 and/or in response to operating parameter data received by microprocessor 62 from one or more locomotives 10. Microprocessor 62 may be configured with a database for storing and logging received digital and analog data that may be used in conjunction with historical data associated with locomotives 10.

MU control driver 56 may be a device configured to generate 72V signals with up to approximately a 10-ampere draw per line. MU control driver 56 may be configured with a 27-pin connection that interfaces with an appropriately configured connector for connecting MU control driver 56 to a first locomotive 10 via cable 60. The 27-pin connection may include one power pin and one negative power pin so that a 72V signal may pass through the device as recognized by those skilled in the art.

The remaining 25 pins may be binary for executing on/off functions associated with locomotives 10, certain ones of which may interface with expansion areas 90, 92. In this respect, each locomotive 10 may be equipped with appropriately configured drivers for turning selected MU control driver pins on/off in response to command signals received from microprocessor 62 via MU control driver 56. Each locomotive 10 may also be configured with appropriate drivers that interpret command signals from microprocessor 62 via MU control driver 56 for turning selected locomotive functions on/off such as via on-board valving or electrical switches.

For example, MU control driver 56 may transmit electronic data signals to a first one of a plurality of locomotives 10 through cable 60. These data signals may be transmitted to the remaining locomotives 10 such as through MU cable 52. This allows for each locomotive 10 undergoing testing to execute a locomotive function or sequence of functions such as sequencing through Notch speeds, activating the emergency brake, sand applications, etc. in response to receipt of data signals transmitted from MU control driver 56. In this respect, each locomotive 10 may engage self-load sequence in preparation for executing the testing sequence.

Run-time operating parameter data generated by each locomotive 10 in response to the locomotive function undergoing testing may be acquired by microprocessor 62. The functionality of each locomotive 10 being tested may be controlled via the MU control driver 56 and run-time operating parameter data may be transmitted to microprocessor 62 from each locomotive 10 at approximately the same time. Microprocessor 62 may be programmed to determine whether the instruction transmitted by MU control driver 56 to locomotives 10 has been executed and modify the testing sequence in response to an instruction not being executed by one or more of the locomotives 10.

Methods of the invention for testing locomotives 10 may be implemented in the same manner by which an end-of-train (EOT) locomotive unit of a consist would be controlled by a lead locomotive. This allows for simulating various operating conditions realized by a train consist such as the train line command signals that would be transmitted from a lead locomotive to the EOT locomotive during operation.

Locomotives 10 undergo various types of maintenance services over their lifetimes. Running maintenance services, or those performed on a regular schedule, may be performed periodically such as three or four times per year. Embodiments of the invention may be used for running maintenance services, road failure services as well as others. Each locomotive 10 may undergo a loading procedure during service so that various systems and subsystems of a locomotive may be tested. The loading procedure may be controlled by MU control driver 56 to cause each locomotive 10 to "load against itself" by using all internal locomotive components so that the locomotive produces horsepower. This allows for monitoring various aspects of the locomotives performance such as how the engine, systems and subsystems are performing in response to the loading procedure.

Figure 4:
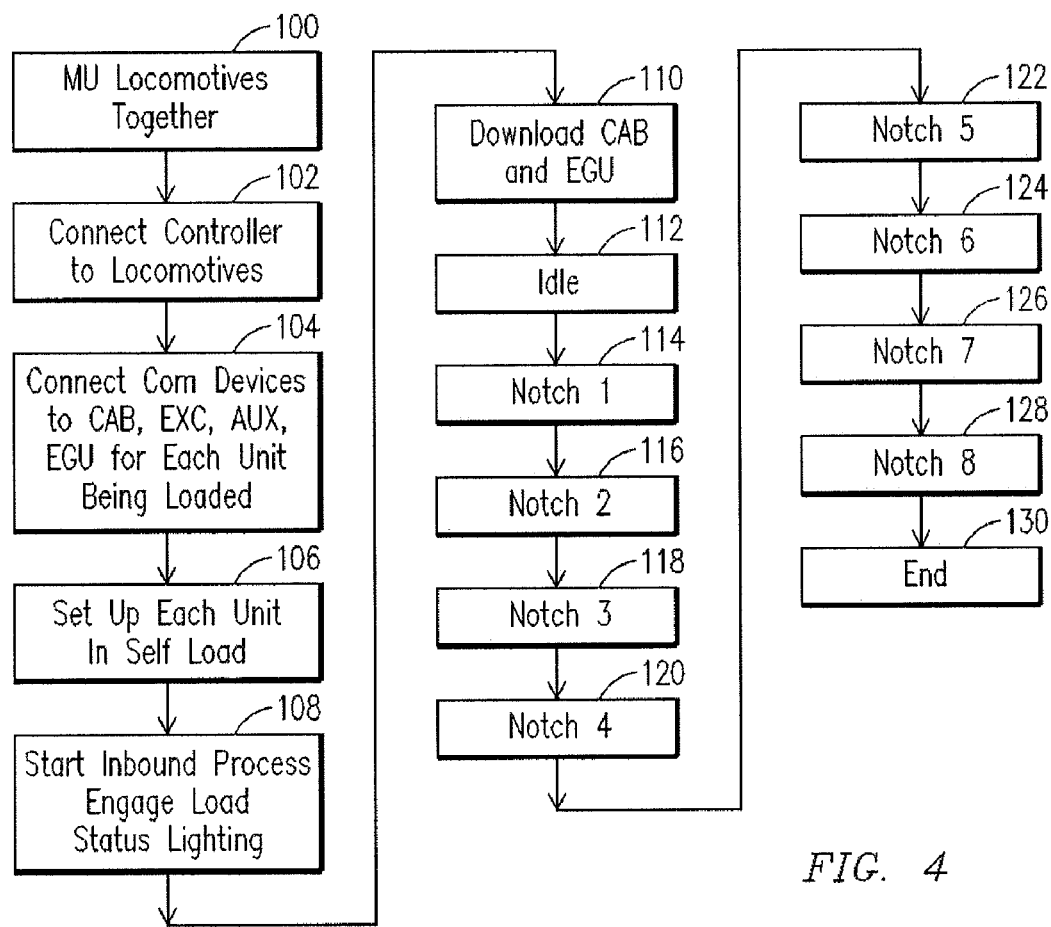
FIG. 4 is a flow chart illustrating exemplary steps of a testing procedure.

FIG. 4 illustrates exemplary steps of the invention for performing certain testing procedures on a locomotive 10, which may be performed simultaneously or contemporaneously on a plurality of locomotives 10. In step 100, a plurality of locomotives, such as those shown in FIG. 3 may be connected together with MU cable 52. The plurality of locomotives 10 may be connected to MU control driver 56 with MU cable 60 in step 102. Microprocessor 62 may be connected to the control panels of each locomotive 10 that will undergo a loading procedure in step 104. For example, microprocessor 62 may be hard wired to or in wireless communication with panels 42, 44, 46, 48 of the plurality of locomotives 10 in FIG. 3. It will be appreciated that aspects of the invention are not limited to a specific number of locomotives 10 and that three locomotives are being used for the purpose of illustration.

Microprocessor 62 may include a processing control module programmed with executable code for implementing various testing sequences. For example, step 106 allows for each locomotive 10 to be setup in a self-load mode so that the locomotive 10 engine is running, an electronic control switch is in run and a self-load switch is on. This may be accomplished by microprocessor 62 transmitting a self-load mode command signal via MU control driver 56 to each locomotive 10, which may then initiate a self-load mode processing module stored on-board the respective locomotives 10.

Other testing modules may be started or enabled in step 108 such as 1) Inbound Process, 2) Engage Load and 3) Status Lighting. In this aspect, the processing control module of microprocessor 62 recognizes that the requirements for testing procedures on the locomotives 10 are correctly setup. A set of status lights may be activated indicating that each locomotive 10 will soon be loading and a signal may be transmitted to each locomotive 10 indicating that the loading sequence will begin provided that all pre-loading conditions are met. The processing control module may activate the engage load when the pre-loading conditions are met. The control module may be programmed with a self-test to ensure that each locomotive 10 is responding to the signal indicating that the loading sequence is set to begin.

Step 110 allows for a respective set of operating parameter data and/or fault log data from CAB panel 42 and EGU panel 48 to be downloaded from each locomotive 10 to database engine 72 via microprocessor 62 and computer 70. The CAB and EGU data may contain identification information allowing microprocessor 62 to identify operating parameters that need to be tested for each of the respective locomotives 10.

As will be readily appreciated by one skilled in the art, structural and/or operational relationships, described thus far in the context of FIG. 4 and/or additionally described in preceding or subsequent disclosure, may be summarized as follows: Operatively controlling during the testing at least one of the respective systems on-board the plurality of mobile assets, such as locomotive 10, to simulate at least one operational condition in response to command instructions programmed in the processor (e.g., microprocessor 62), as shown in block 250. The command instructions may be configured to acquire operating parameter data indicative of an ability of such respective system to perform the simulated operational condition, as shown in block 252.

In this respect, each locomotive 10 may include different configurations of on-board systems and subsystems. The identification information provides instructions to the microprocessor 62 so the appropriate operating parameters may be selected for testing for each respective locomotive 10. Operating parameter data downloaded in step 110 may be a discrete amount of data based on testing protocols for a particular on-board system or subsystem, which may be modified as desired.

Respective sets of operating parameter data from EXC panel 44 and AUX panel 46 may also be downloaded in step 110, as well as any other sets of operating parameter data needed for conducting tests on locomotives 10. Each locomotive 10 may then be instructed to operate their respective engines in idle in step 112 for a predetermined period of time. This allows for systems and subsystems of each locomotive 10 to ramp-up to a minimal operating threshold for performance of certain.

For example, allowing locomotives 10 to idle for a predetermined amount of time permits their engines to achieve a desired temperature and other steady state operating characteristics needed for testing their respective systems and subsystems. Steps 112-128 allow for each locomotive to simultaneously or contemporaneously sequence through respective engine speeds Notch 1 through Notch 8 as further explained in FIGS. 5 and 6. This sequence of testing may end in step 130. It will be appreciated that aspects of the invention may be implemented simultaneously or synchronously but that certain aspects may be implemented contemporaneously due to practical or physical considerations.

Figure 5:
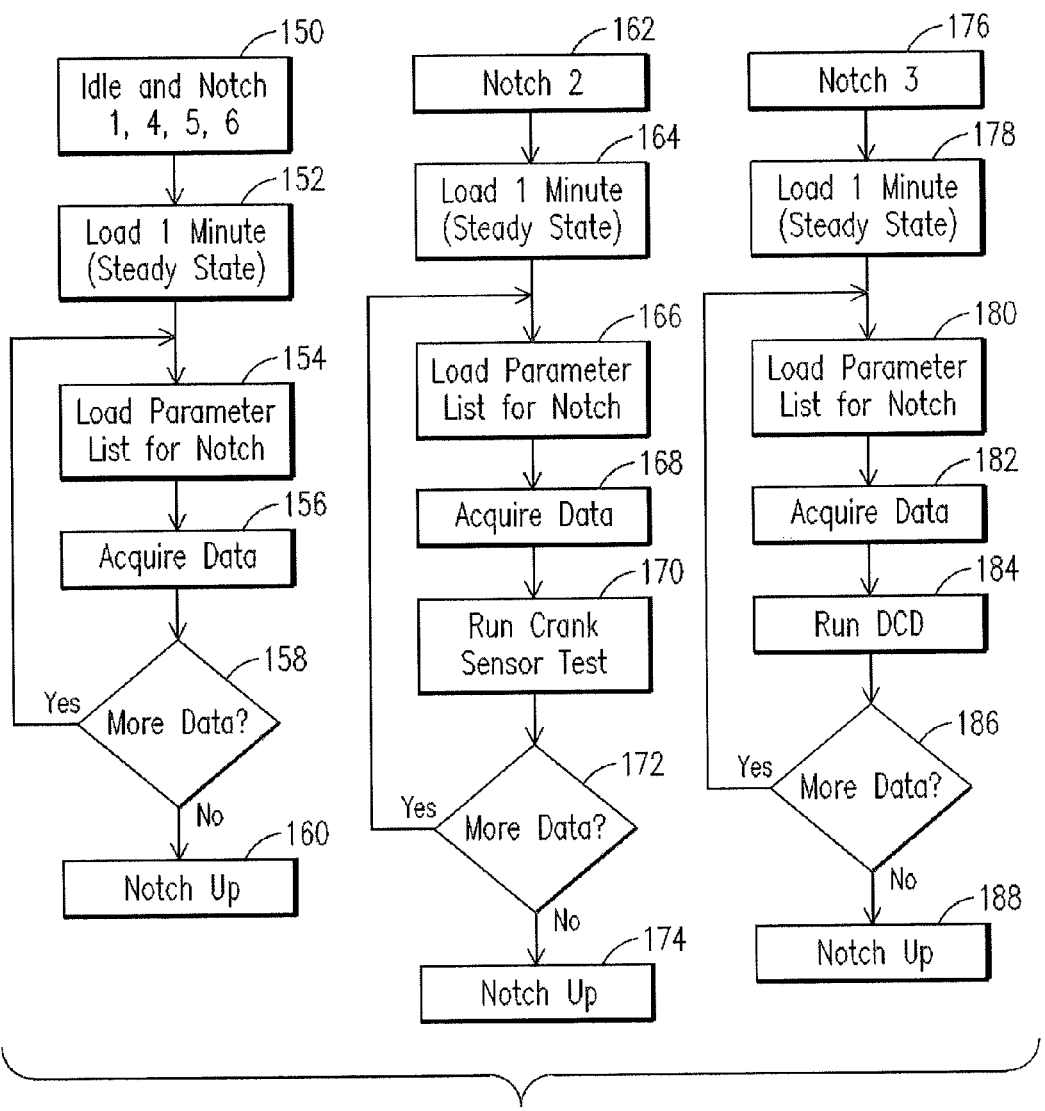
FIG. 5 is a flow chart illustrating exemplary steps of a testing procedure.
Figure 6:
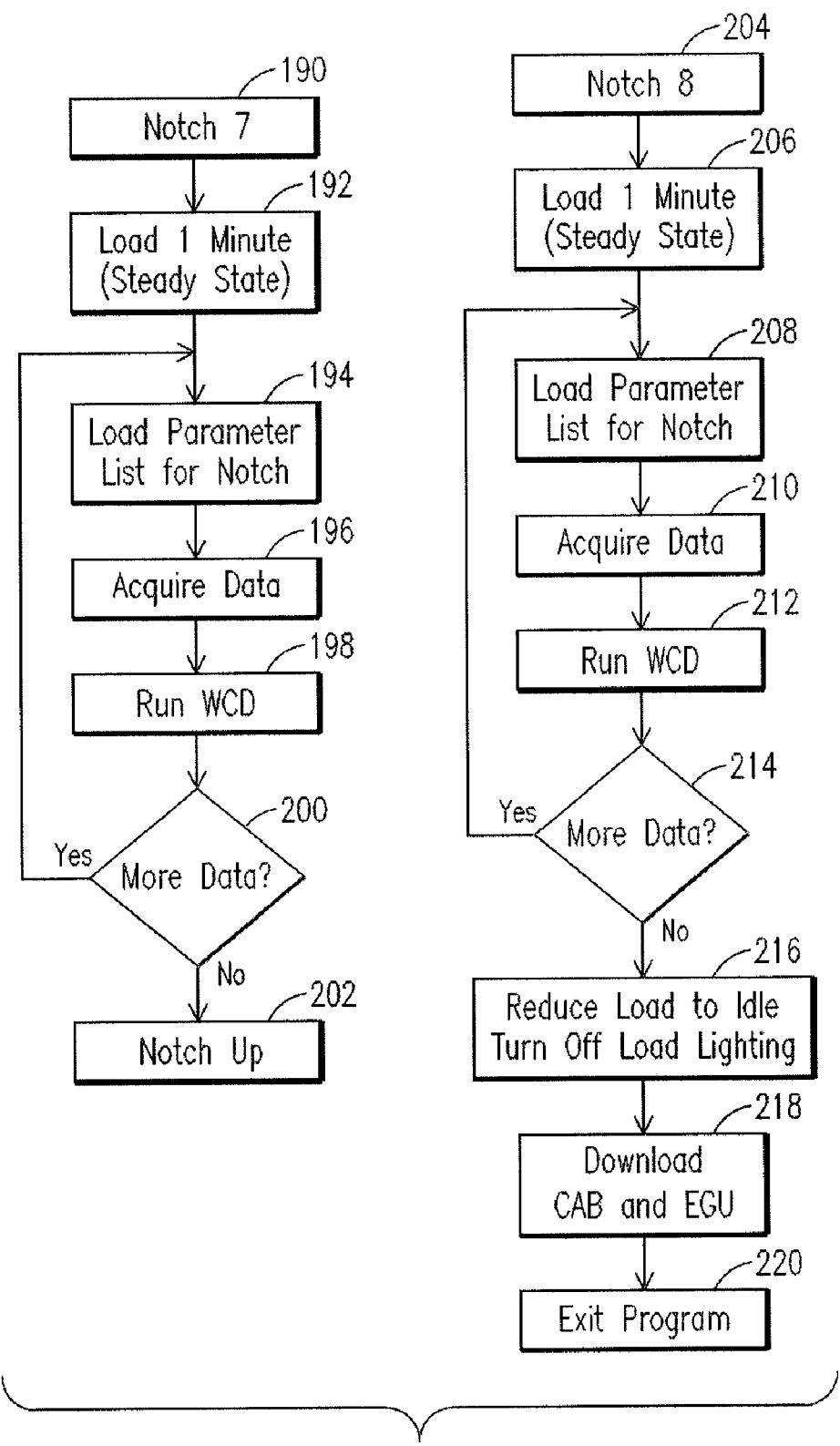
FIG. 6 is a flow chart illustrating exemplary steps of a testing procedure.
Figure 7:
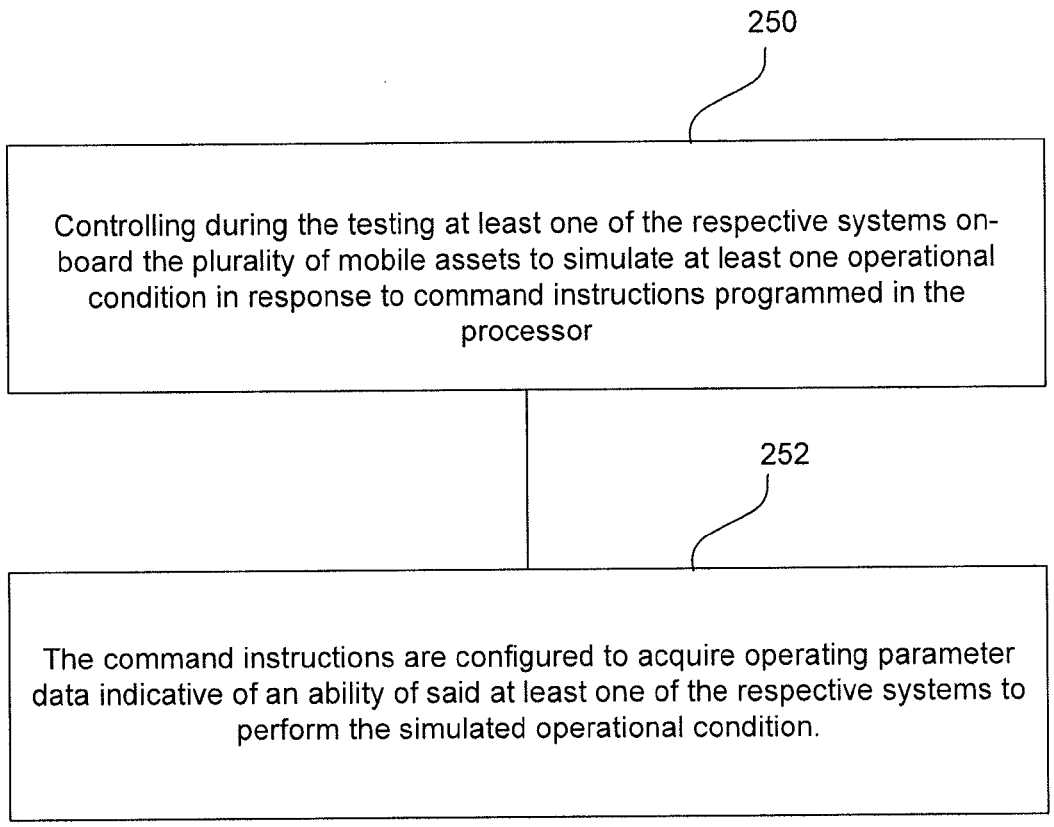
FIG. 7 illustrates example steps in connection with the flow diagrams for the testing procedures illustrated in FIGS. 4-6.

FIG. 5 illustrates exemplary steps of the invention for or contemporaneously performing certain testing procedures plurality of locomotives 10. In step 150, locomotives 10 may be instructed to remain in engine idle for a predetermined period of time and run their respective engines at Notch settings 1, 4, 5 and 6 as part of a testing sequence. Locomotives 10 may be tested at each of these Notch settings, individually, in steps 152-160.

Step 152 allows for each locomotive 10 to sequence through a loading procedure for a predetermined period of time at a selected Notch setting, which may be approximately one minute. In this respect, each of the plurality of locomotives 10 may sequence through the loading procedure for about one minute while operating parameter data is transmitted from the locomotives 10 to microprocessor 62. Microprocessor 62 may be programmed to evaluate data from the locomotives 10 to verify that on-board functionality, systems and subsystems are performing within acceptable limits, at which time a steady state is achieved in step 152 and the plurality of locomotives 10 are ready for further testing.

Step 154 allows for a first operating parameter list to be loaded for a particular Notch setting. Microprocessor 62 may be programmed to retrieve a predetermined list of operating parameters of interest with respect to the performance of the plurality of locomotives 10 at a particular Notch setting. The list of operating parameters may be stored in a database associated with microprocessor 62. The first operating parameter list may be loaded into the executable program stored on microprocessor 62, which may be programmed for testing the locomotive systems and/or subsystems associated with the first operating parameter list at the associated Notch setting.

Step 156 allows for microprocessor 62 to simultaneously acquire run-time operating parameter data from each locomotive 10 associated with the operating parameter list loaded in step 154. Operating parameter data may be acquired in step 156 for a predetermined period of time or continuously until certain conditions are met, such as validating that a function, system or subsystem of locomotives 10 is operating within upper and lower specification limits.

If more data is required in step 158, such as when more operating parameters need to be loaded for testing locomotives 10 at a particular Notch setting, then the executable program may loop back to step 154 and load a second operating parameter list, which may differ from the first operating parameter list. Operating parameter data may be acquired in step 158 until all operating parameters of the operating parameter list for a particular Notch setting have been tested. This may be accomplished by loading the operating parameter list for a particular Notch setting as one list or as a plurality of discrete lists then acquiring the associated operating parameter data in step 156. Operating parameter data may be acquired in step 156 until all operating parameters have been loaded and tested or until a maximum amount of time elapses. If no additional data needs to be acquired for completing testing of the plurality of locomotives 10 at a particular Notch setting then step 160 allows for the plurality of locomotives 10 to sequence up to a different Notch setting such as Notch 2 in step 162.

In step 162, the plurality of locomotives 10 may sequence up to Notch 2. Step 164 allows for each locomotive 10 to sequence through a loading procedure at Notch 2 for a predetermined period of time, which may be approximately one minute. In this respect, each of the plurality of locomotives 10 may sequence through the loading procedure at Notch 2 for about one minute while operating parameter data is transmitted from the locomotives 10 to microprocessor 62. Microprocessor 62 may be programmed to evaluate data from the locomotives 10 to verify that on-board functionality, systems and subsystems are performing within acceptable limits at Notch 2, at which time a steady state is achieved in step 162 and the plurality of locomotives 10 are ready for further testing.

Step 166 allows for a first Notch 2 operating parameter list to be loaded into the executable program on microprocessor 62. Microprocessor 62 may be programmed to retrieve a predetermined list of Notch 2 operating parameters stored in a database associated with microprocessor 62. The Notch 2 operating parameter list may be loaded into the executable program stored on microprocessor 62, which may be programmed for testing locomotive systems and/or subsystems at the Notch 2 setting.

Step 168 allows for microprocessor 62 to simultaneously acquire run-time operating parameter data from each locomotive 10 associated with the selected Notch 2 operating parameter list loaded in step 166. Operating parameter data may be acquired in step 168 for a predetermined period of time or continuously until certain conditions are met, such as validating that a function, system or subsystem of locomotives 10 is operating within upper and lower specification limits. Step 170 allows for a crank sensor test to be run to determine whether the respective cranks of each locomotive 10 are operating within acceptable operating limits. The crank sensor test may be executed via an on-board self-test program stored in an on-board computer 36, 38.

If more data is required in step 172, such as when more operating parameters need to be loaded for testing locomotives 10 at the Notch 2 setting, then the executable program may loop back to step 166 and load a second Notch 2 operating parameter list, which may be different from the first Notch 2 operating parameter list. Operating parameter data may be acquired in step 172 until all operating parameters of the operating parameter list for the Notch 2 setting have been tested. This may be accomplished by loading the operating parameter list for the Notch 2 setting as one list or as a plurality of discrete lists then acquiring the associated operating parameter data in step 172. Operating parameter data may be acquired in step 172 until all operating parameters have been loaded and tested for the Notch 2 setting or until a maximum amount of time elapses. If no additional data needs to be acquired for completing testing of the plurality of locomotives 10 at the Notch 2 setting then step 174 allows for the plurality of locomotives 10 to sequence up to a different Notch setting such as Notch 3 in step 176.

In step 176, the plurality of locomotives 10 may sequence up to Notch 3. Step 178 allows for each locomotive 10 to sequence through a loading procedure at Notch 3 for a predetermined period of time, which may be approximately one minute. In this respect, each of the plurality of locomotives 10 may sequence through the loading procedure at Notch 3 for about one minute while operating parameter data is transmitted to microprocessor 62. Microprocessor 62 may be programmed to evaluate data from the locomotives 10 to verify that on-board functionality, systems and subsystems are performing within acceptable limits at Notch 3, at which time a steady state is achieved in step 178 and the plurality of locomotives 10 are ready for further testing.

Step 180 allows for a first Notch 3 operating parameter list to be loaded into the executable program on microprocessor 62. Microprocessor 62 may be programmed to retrieve a predetermined list of Notch 3 operating parameters stored in a database associated with microprocessor 62. The Notch 3 operating parameter list may be loaded into the executable program stored on microprocessor 62, which may be programmed for testing locomotive systems and/or subsystems at the Notch 3 setting.

Step 182 allows for microprocessor 62 to simultaneously acquire run-time operating parameter data from each locomotive 10 associated with the selected Notch 3 operating parameter list loaded in step 180. Operating parameter data may be acquired in step 182 for a predetermined period of time or continuously until certain conditions are met, such as validating that a function, system or subsystem of locomotives 10 is operating within upper and lower specification limits. Step 184 allows for running a dead cylinder detection (DCD) test on the engine cylinders of each locomotive to determine whether the respective cylinders of each locomotive 10 are operating within acceptable operating limits. The DCD test may be executed via an on-board self-test program stored in an on-board computer 36, 38.

If more data is required in step 186, such as when more operating parameters need to be loaded for testing locomotives 10 at the Notch 3 setting, then the executable program may loop back to step 180 and load a second Notch 3 operating parameter list, which may be different from the first Notch 3 operating parameter list. Operating parameter data may be acquired in step 172 until all operating parameters of the operating parameter list for the Notch 3 setting have been tested. This may be accomplished by loading the operating parameter list for the Notch 3 setting as one list or as a plurality of discrete lists then acquiring the associated operating parameter data in step 182. Operating parameter data may be acquired in step 182 until all operating parameters have been loaded and tested for the Notch 3 setting or until a maximum amount of time elapses. If no additional data needs to be acquired for completing testing of the plurality of locomotives 10 at the Notch 3 setting then step 188 allows for the plurality of locomotives 10 to sequence up to a different Notch setting such as Notch 4 in step 150.

Testing at Notch 4 may be performed in steps 152 through 160, at which time testing may proceed to Notch 5 in step 150. Testing at Notch 5 may be performed in steps 152 through 160, at which time testing may proceed to Notch 6 in step 150. Testing at Notch 6 may be performed in steps 152 through 160, at which time testing may proceed to Notch 7 in step 190.

In step 190, the plurality of locomotives 10 may sequence up to Notch 7. Step 192 allows for each locomotive 10 to sequence through a loading procedure at Notch 7 for a predetermined period of time, which may be approximately one minute. In this respect, each of the plurality of locomotives 10 may sequence through the loading procedure at Notch 7 for about one minute while operating parameter data is transmitted to microprocessor 62. Microprocessor 62 may be programmed to evaluate data from the locomotives 10 to verify that on-board functionality, systems and subsystems are performing within acceptable limits at Notch 7, at which time a steady state is achieved in step 192 and the plurality of locomotives 10 are ready for further testing.

Step 194 allows for a first Notch 7 operating parameter list to be loaded into the executable program on microprocessor 62. Microprocessor 62 may be programmed to retrieve a predetermined list of Notch 7 operating parameters stored in a database associated with microprocessor 62. The Notch 7 operating parameter list may be loaded into the executable program stored on microprocessor 62, which may be programmed for testing locomotive systems and/or subsystems at the Notch 7 setting.

Step 196 allows for microprocessor 62 to simultaneously acquire run-time operating parameter data from each locomotive 10 associated with the selected Notch 7 operating parameter list loaded in step 194. Operating parameter data may be acquired in step 196 for a predetermined period of time or continuously until certain conditions are met, such as validating that a function, system or subsystem of locomotives 10 is operating within upper and lower specification limits. Step 198 allows for running a weak cylinder detection (WCD) test on the engine cylinders of each locomotive 10 to determine the overall operating performance or "health" of each respective cylinder. For example, a locomotive 10 may be unable to make Notch 8 horsepower from Notch 7 horsepower, in which case the WCD test may be performed to determine the health of the engine's cylinders. Microprocessor 62 may be programmed to instruct an on-board panel 36, 38 to run the WCD test based on predetermined conditions. The WCD test may be executed via an on-board self-test program stored in an on-board computer 36, 38.

If more data is required in step 200, such as when more operating parameters need to be loaded for testing locomotives 10 at the Notch 7 setting, then the executable program may loop back to step 194 and load a second Notch 7 operating parameter list, which may be different from the first Notch 7 operating parameter list. Operating parameter data may be acquired in step 196 until all operating parameters of the operating parameter list for the Notch 7 setting have been tested. This may be accomplished by loading the operating parameter list for the Notch 7 setting as one list or as a plurality of discrete lists then acquiring the associated operating parameter data in step 196. Operating parameter data may be acquired in step 196 until all operating parameters have been loaded and tested for the Notch 7 setting or until a maximum amount of time elapses. If no additional data needs to be acquired for completing testing of the plurality of locomotives 10 at the Notch 7 setting then step 202 allows for the plurality of locomotives 10 to sequence up to a different Notch setting such as Notch 8 in step 204.

In step 204, the plurality of locomotives 10 may sequence up to Notch 8. Step 206 allows for each locomotive 10 to sequence through a loading procedure at Notch 8 for a predetermined period of time, which may be approximately one minute. In this respect, each of the plurality of locomotives 10 may sequence through the loading procedure at Notch 8 for about one minute while operating parameter data is transmitted to microprocessor 62. Microprocessor 62 may be programmed to evaluate data from the locomotives 10 to verify that on-board functionality, systems and subsystems are performing within acceptable limits at Notch 8, at which time a steady state is achieved in step 206 and the plurality of locomotives 10 are ready for further testing.

Step 208 allows for a first Notch 8 operating parameter list to be loaded into the executable program on microprocessor 62. Microprocessor 62 may be programmed to retrieve a predetermined list of Notch 8 operating parameters stored in a database associated with microprocessor 62. The Notch 8 operating parameter list may be loaded into the executable program stored on microprocessor 62, which may be programmed for testing locomotive systems and/or subsystems at the Notch 8 setting.

Step 210 allows for microprocessor 62 to simultaneously acquire run-time operating parameter data from each locomotive 10 associated with the selected Notch 8 operating parameter list loaded in step 208. Operating parameter data may be acquired in step 210 for a predetermined period of time or continuously until certain conditions are met, such as validating that a function, system or subsystem of locomotives 10 is operating within upper and lower specification limits. Step 212 allows for running the WCD test on the engine cylinders of each locomotive 10 to determine the overall operating performance or "health" of each respective cylinder. Microprocessor 62 may be programmed to instruct an on-board panel 36, 38 to run the WCD test at the Notch 8 setting based on predetermined conditions. The WCD test may be executed via an on-board self-test program stored in an on-board computer 36, 38.

If more data is required in step 214, such as when more operating parameters need to be loaded for testing locomotives 10 at the Notch 8 setting, then the executable program may loop back to step 208 and load a second Notch 8 operating parameter list, which may be different from the first Notch 8 operating parameter list. Operating parameter data may be acquired in step 210 until all operating parameters of the operating parameter list for the Notch 8 setting have been tested. This may be accomplished by loading the operating parameter list for the Notch 8 setting as one list or as a plurality of discrete lists then acquiring the associated operating parameter data in step 210. Operating parameter data may be acquired in step 210 until all operating parameters have been loaded and tested for the Notch 8 setting or until a maximum amount of time elapses.

If no more data is needed in step 214 then step 216 allows for the respective engine speeds of locomotives 10 to be reduced to idle and turning off load lighting. In this aspect, the respective locomotive engines may return to the state they were in prior to initiating the loading sequence. Operating parameter data from one or more respective panels 42, 44, 46, 48 may be downloaded to a database 73 in step 218 and the executable program may be exited in step 220. For example, in step 218 operating parameter run-time data, which may include fault log data indicative of faults detected during the testing procedures or service use of a locomotive 10 may be downloaded into database 73.

Fault log data may include operating parameter data indicative of the operating conditions of a system or subsystem of a locomotive 10 within a predetermined period of time before, during and after a system or subsystem fault is detected. Aspects of the invention allow for run-time data acquired during testing of one or more locomotives 10 to be analyzed independent of or in conjunction with fault log data to develop predictive maintenance practices and procedures.

Operators of locomotives or fleets of locomotives 10 desire maximizing utilization of the locomotives to be cost effective and competitive in the marketplace. Maximizing utilization of locomotives 10 may depend at least in part on performing preventative maintenance and/or repair of systems, subsystems or other functional aspects of the locomotives. Embodiments of the invention may be programmed to determine that a given system, subsystem and/or other component of a locomotive 10 may be on an imminent path toward near term failure based on information pertaining to the locomotive's 10 run-time operating parameters downloaded during the testing procedures. Embodiments may also be configured to perform various diagnostic tests on the systems and subsystems of locomotives 10.

Embodiments of the invention allow for significant cost savings and increased accuracy in predicting component failure during testing of locomotives 10. It has been determined that one trained technician may perform testing on four locomotives 10 in approximately four hours using embodiments of the invention. Using prior testing procedures, it took two trained technicians four hours to perform similar tests on one locomotive. Thus, the overall efficiency of a locomotive or fleet of locomotives is significantly improved.

It is contemplated that embodiments of the invention may provided as a kit to end users for simultaneously testing or performing diagnostics on a plurality of locomotives 10 in a consist. Such a kit may include MU control driver 56, microprocessor 62 and/or a computer-readable medium having software stored thereon for implementing methods of the invention, and a harness of MU cable 60, 52 for conveniently connecting MU driver 56 to a first locomotive 10 and connecting the plurality of locomotives 10 together.

Although illustrated and described with respect to one or more railroad locomotives 10, those skilled in the art will understand that the teachings of the present invention are applicable to many types of equipment, including those which may be part of a large fleet, such as trucks, ships, off-road vehicles, airplanes, etc.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

What is claimed is:

1. A method of testing through a common user interface a respective system on-board each of a plurality of mobile assets undergoing maintenance services, the method comprising:

arranging in the common user interface a diagnostics processor to control and command testing and diagnostics for the plurality of mobile assets undergoing the maintenance services;

communicatively coupling the diagnostics processor to at least one of the plurality of mobile assets by way of a connector cable when the plurality of mobile assets is undergoing the maintenance services;

establishing electrical communication between the mobile assets for communicating electronic signals during the testing;

operatively controlling during the testing at least one of the respective systems on-board the plurality of mobile assets to simulate at least one operational condition in response to command instructions programmed in the processor, wherein the command instructions are configured to acquire operating parameter data indicative of an ability of said at least one of the respective systems to perform the simulated operational condition;

communicating an electronic signal from the common user interface to the plurality of mobile assets instructing a respective on-board computer of each mobile asset to engage a loading sequence;

communicating an electronic signal from the common user interface to the plurality of mobile assets instructing a respective engine of each mobile asset to execute a testing sequence; and communicating through the common user interface operating parameter data associated with the respective systems from each of the plurality of mobile assets to a database engine, wherein said common user interface enables a user to contemporaneously test the plurality of mobile assets undergoing the maintenance services without the user having to separately access each of said mobile assets to perform the testing in connection with the maintenance services one mobile asset at a time.

2. The method of claim 1 further comprising:

storing the operating parameter data in a database table;

setting an upper operating limit and a lower operating limit based on historical operating parameter data; and determining whether the operating parameter data is within acceptable operating limits by comparing the operating parameter data to at least one of the upper operating limit and the lower operating limit.

3. The method of claim 1, wherein the plurality of mobile assets comprises a plurality of locomotives and the method further comprises executing the testing sequence so that the respective engines of each locomotive sequence through a plurality of notch speed settings.

4. The method of claim 3 further comprising:
selecting a first operating parameter list for testing the respective systems on-board each of the plurality of locomotives at a first one of the notch speed settings;
loading the first operating parameter list into an executable program stored on a microprocessor, the executable program configured for implementing the testing sequence; and
communicating through the common user interface respective first sets of operating parameter data associated with the first operating parameter list from each of the plurality of locomotives to the database engine when the respective engines of the plurality of locomotives are operating at the first one of the notch speed settings.

5. The method of claim 4 further comprising:
determining whether all operating parameters have been selected for completing testing of the respective systems on-board each of the plurality of locomotives at the first one of the notch speed settings;
selecting a second operating parameter list for testing the respective systems on-board each of the plurality of locomotives at the first one of the notch speed settings if testing of the respective systems has not been completed;
loading the second operating parameter list into the executable program stored on the microprocessor; and
communicating through the common user interface respective second sets of operating parameter data associated with the second operating parameter list from each of the plurality of locomotives to the database engine when the respective engines of the plurality of locomotives are operating at the first one of the notch speed settings.

6. The method of claim 1, wherein the plurality of mobile assets comprises a plurality of locomotives, and the method further comprises:
communicating the electronic signal from the common user interface to the plurality of locomotives instructing the respective on-board computers of each locomotive to engage the loading sequence for a predetermined period of time;
communicating the electronic signal from the common user interface to the plurality of locomotives instructing the respective engines of each locomotive to execute the testing sequence so that the respective engines sequence through a plurality of notch speed settings after expiration of the predetermined period of time;
communicating through the common user interface operating parameter data associated with the respective systems from each of the plurality of locomotives at each of the plurality of notch speed settings to the database engine; and
determining whether the downloaded operating parameter data is within acceptable operating limits at each of the plurality of notch speed settings.

7. The method of claim 1, wherein the plurality of mobile assets comprises a plurality of locomotives, the method further comprising operatively coupling a microprocessor and a multiple-unit control driver to form the common user interface, wherein the microprocessor is configured with an executable program for implementing the testing sequence and communicating a control instruction, and further wherein the multiple-unit control driver is configured for communicating an electronic signal to the plurality of locomotives instructing the respective on-board computers of each locomotive to synchronously engage the loading sequence in response to receipt of the control instruction by the multiple-unit control driver.

8. The method of claim 7 further comprising:
executing the testing sequence so that the respective engines of each locomotive sequence through a plurality of notch speed settings;
communicating through the common user interface operating parameter data associated with the respective systems from each of the plurality of locomotives at predetermined ones of the plurality of notch speed settings to the database engine; and
determining whether the downloaded operating parameter data is within acceptable operating limits.

9. The method of claim 1, wherein the plurality of mobile assets comprises a plurality of locomotives and the method further comprises:
executing the testing sequence so that the respective engines of each locomotive sequence through a plurality of notch speed settings; and
communicating an electronic signal from the common user interface to the plurality of locomotives to execute an on-board self-test program at a predetermined notch speed setting.

10. The method of claim 1 further comprising comparing the operating parameter data to historical operating parameter data to determine whether the downloaded operating parameter data is within acceptable operating limits.

11. A method for testing a plurality of mobile assets undergoing maintenance services, the method comprising:
establishing electrical communication between the mobile assets for communicating electronic signals during the testing;
communicatively coupling a microprocessor and a multiple-unit control driver to at least one of the plurality of mobile assets by way of a connector cable when the plurality of mobile assets is undergoing the maintenance services;
configuring the microprocessor and multiple-unit control driver to control and command testing and diagnostics for the plurality of mobile assets undergoing the maintenance services;
communicating a control instruction from the microprocessor to the multiple-unit control driver, the control instruction programmed to execute a testing sequence associated with the plurality of mobile assets, wherein the testing sequence is configured to simulate at least one operational condition;
communicating an electronic signal from the multiple-unit control driver to a first one of the plurality of mobile assets, the electronic signal indicative of the control instruction;
communicating the electronic signal from the first one of the plurality of mobile assets to the remaining ones of the plurality of mobile assets;
acquiring operating parameter data from each of the plurality of mobile assets in response to the testing sequence, the operating parameter data indicative of operating characteristics of at least one respective system on-board each of the plurality of mobile assets regarding the simulated operational condition;

storing the acquired operating parameter data in a database engine loaded on a microprocessor; and operatively coupling the microprocessor with the multiple-unit control driver to form a common user interface that enables a user to contemporaneously test the plurality of mobile assets undergoing the maintenance services without the user having to separately test each of said mobile assets to perform the testing in connection with the maintenance services one mobile asset at a time.

12. The method of claim 11, wherein the plurality of mobile assets comprises a plurality of locomotives and the method further comprises: executing the testing sequence so that respective engines on-board each of the plurality of locomotives sequences through a plurality of respective notch speed settings; and analyzing the acquired operating parameter data to determine whether one or more of the respective systems on board at least one of the plurality of locomotives is operating outside of a set of operating limits.

13. The method of claim 12 further comprising acquiring operating parameter data from each of the plurality of locomotives, the operating parameter data indicative of run-time operating characteristics of at least one respective system on-board each of the plurality of locomotives at each of the plurality of notch speed settings.

14. The method of claim 13 further comprising communicating the control instruction configured to execute an on-board self-test program at a predetermined notch speed setting.

15. The method of claim 14 further comprising:

acquiring self-test operating parameter data from each of the plurality of locomotives in response to execution of the on-board self-test program;

storing the acquired self-test operating parameter data in the database engine; and comparing the acquired self-test operating parameter data to historical operating parameter data to determine whether the acquired self-test operating parameter data is within acceptable operating limits.

16. A system for testing respective on-board systems of a plurality of mobile assets undergoing maintenance services, the system comprising:

a communications link for establishing electrical communication between the mobile assets for communicating electronic signals during the testing;

a microprocessor comprising a control processing module programmed with executable code for communicating electronic signals indicative of control instructions for implementing a mobile asset testing sequence associated with at least one of the respective on-board systems of the plurality of mobile assets, wherein the testing sequence is configured to simulate at least one operational condition in response to the control instructions, wherein the control instructions are configured to acquire operating parameter data at least indicative of an ability of said at least one of the respective systems to perform the simulated operational condition;

a multiple-unit control driver for communicating control signals to the plurality of mobile assets in response to receipt of the control instructions from the microprocessor, wherein the microprocessor and the multiple-unit control driver constitute a command and control diagnostics processor communicatively coupled to at least one of the plurality of mobile assets by way of a connector cable when the plurality of mobile assets is undergoing the maintenance services; and a database engine for storing a plurality of respective operating parameter data associated with the on-board systems undergoing the testing sequence communicated from respective ones of the plurality of mobile assets to the microprocessor, wherein the microprocessor in combination with the multiple-unit control driver constitute a common user interface that enables a user to contemporaneously test the plurality of mobile assets undergoing the maintenance services without the user having to separately test each of said mobile assets to perform the testing in connection with the maintenance services one mobile asset at a time.

17. The system of claim 16, the microprocessor further comprising:

a plurality of serial connections interfacing with respective ones of the plurality of mobile assets;

an analog-to-digital converter for receiving an electronic signal from at least one of the respective on-board systems to determine a state of the at least one respective on-board system; and a direct current-to-direct current converter for receiving an electronic signal from at least one of the respective on-board systems to determine a state of the at least one respective on-board system.

18. The system of claim 16 further comprising a processing module configured with executable code for running a query against the database table and setting upper and lower operating limits with respect to at least one of the plurality of operating parameter data.

19. The system of claim 18 further comprising a processing module configured with executable code for comparing the plurality of respective operating parameter data to historical operating parameter data and determine whether the plurality of respective operating parameter data is within acceptable limits.

20. A method of testing through a common user interface a respective system on-board each of a plurality of mobile assets undergoing maintenance services, the method comprising:

arranging in the common user interface a diagnostics processor to control and command testing and diagnostics for the plurality of mobile assets undergoing the maintenance services;

coupling the diagnostics processor to provide local communication with the plurality of mobile assets undergoing the maintenance services, the diagnostics processor configured to control and command testing and diagnostics of the plurality of mobile assets undergoing the maintenance services;

establishing electrical communication between the mobile assets for communicating electronic signals during the testing;

operatively controlling during the testing at least one of the respective systems on-board the plurality of mobile assets to perform at least one simulated operational condition in response to control instructions programmed in the processor, wherein the control instructions are configured to acquire operating parameter data at least indicative of an ability of said at least one of the respective systems to perform the simulated operational condition;

communicating an electronic signal from the common user interface to the plurality of mobile assets instructing a respective on-board computer of each mobile asset to engage a loading sequence;

communicating an electronic signal from the common user interface to the plurality of mobile assets instructing a respective engine of each mobile asset to execute a testing sequence; and communicating through the common user interface operating parameter data associated with the respective systems from each of the plurality of mobile assets to a database engine, wherein said common user interface enables a user to contemporaneously test the plurality of mobile assets undergoing the maintenance services without the user having to separately access each of said mobile assets to perform the testing in connection with the maintenance services one mobile asset at a time.

21. The method of claim 20, wherein the coupling of the diagnostics processor to provide said local communication is effected by a wired communication link.

22. The method of claim 20 wherein the coupling of the diagnostics processor to provide said local communication is effected by a wireless communication link.

23. A system for testing respective on-board systems of a plurality of mobile assets undergoing maintenance services, the system comprising:

a communications link for establishing electrical communication between the mobile assets for communicating electronic signals during the testing;

a microprocessor comprising a control processing module programmed with executable code for communicating electronic signals indicative of control instructions for implementing a mobile asset testing sequence associated with the respective on-board systems of the plurality of mobile assets, wherein the testing sequence is configured to simulate at least one operational condition in response to the control instructions, wherein the control instructions are configured to acquire operating parameter data at least indicative of an ability of said at least one of the respective systems to perform the simulated operational condition;

a multiple-unit control driver for communicating control signals to the plurality of mobile assets in response to receipt of the control instructions from the microprocessor, wherein the microprocessor and the multiple-unit control driver constitute a command and control diagnostics processor coupled by way of a local communication link with the plurality of mobile assets undergoing the maintenance services; and a database engine for storing a plurality of respective operating parameter data associated with the on-board systems undergoing the testing sequence communicated from respective ones of the plurality of mobile assets to the microprocessor, wherein the microprocessor in combination with the multiple-unit control driver constitute a common user interface that enables a user to contemporaneously test the plurality of mobile assets undergoing the maintenance services without the user having to separately test each of said mobile assets to perform the testing in connection with the maintenance services one mobile asset at a time.

24. The system of claim 23, wherein the local communication link is a wired communication link.

25. The system of claim 23, wherein the local communication link is a wireless communication link.

* * * * *